(12) United States Patent
Pianka

(10) Patent No.: US 11,968,010 B2
(45) Date of Patent: Apr. 23, 2024

(54) SYSTEMS AND METHODS FOR BEAMFORMING OF BROADCAST AND SYNCHRONIZATION CHANNELS

(71) Applicant: CommScope Technologies LLC, Hickory, NC (US)

(72) Inventor: Boaz Pianka, Lexington, MA (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 18/055,616

(22) Filed: Nov. 15, 2022

(65) Prior Publication Data
US 2023/0155652 A1 May 18, 2023

Related U.S. Application Data

(60) Provisional application No. 63/279,520, filed on Nov. 15, 2021.

(51) Int. Cl.
*H04B 7/06* (2006.01)
*H04B 7/0456* (2017.01)
*H04W 48/10* (2009.01)

(52) U.S. Cl.
CPC ......... *H04B 7/0617* (2013.01); *H04B 7/0456* (2013.01); *H04B 7/0682* (2013.01); *H04W 48/10* (2013.01)

(58) Field of Classification Search
CPC .. H04B 7/0617; H04B 7/0456; H04B 7/0682; H04B 7/0691; H04B 7/0695; H04W 48/10
USPC .......................................................... 375/267
See application file for complete search history.

(56) References Cited

U.S. PATENT DOCUMENTS

| | | | |
|---|---|---|---|
| 2009/0016252 A1* | 1/2009 | Ho | H04W 52/0283 370/311 |
| 2018/0139712 A1 | 5/2018 | Abedini et al. | |
| 2018/0343605 A1* | 11/2018 | Wu | H04W 72/0446 |
| 2020/0154409 A1 | 5/2020 | Kang et al. | |

(Continued)

OTHER PUBLICATIONS

International Searching Authority, "International Search Report and Written Opinion", from PCT Application No. PCT/US2022/079878, from Foreign Counterpart to U.S. Appl. No. 18/055,616, dated Mar. 16, 2023, pp. 1 through 11, Published in: WO.

*Primary Examiner* — Fitwi Y Hailegiorgis
(74) *Attorney, Agent, or Firm* — Fogg & Powers LLC

(57) ABSTRACT

Systems and methods for beamforming of broadcast and synchronization channels are provided. In one example, a system includes a BBU, RU(s) communicatively coupled to the BBU, and antennas communicatively coupled to the RU(s). Each RU is communicatively coupled to a respective subset of antennas. The BBU, RU(s), and antennas implement a base station for wirelessly communicating with UEs. The base station is configured to map a synchronization signal to the antennas during a sequence of time periods, transmit the synchronization signal via each respective subset of antennas with a first antenna beam pattern during a first time period of the sequence of time periods, and transmit the synchronization signal via each respective subset of the antennas with a second antenna beam pattern during a second time period of the sequence of time periods. The first antenna beam pattern is different than the second antenna beam pattern.

20 Claims, 5 Drawing Sheets

(56) References Cited

U.S. PATENT DOCUMENTS

2021/0136815 A1  5/2021  Kim et al.
2021/0234591 A1  7/2021  Eleftheriadis et al.
2021/0298087 A1  9/2021  Ohara

* cited by examiner

SYSTEMS AND METHODS FOR BEAMFORMING OF BROADCAST AND SYNCHRONIZATION CHANNELS

CROSS-REFERENCE TO RELATED APPLICATIONS

This application claims benefit of U.S. Provisional Application Ser. No. 63/279,520, filed on Nov. 15, 2021, and titled "SYSTEMS AND METHODS FOR BEAMFORMING OF BROADCAST AND SYNCHRONIZATION CHANNELS," the contents of which are hereby incorporated by reference herein in their entirety.

BACKGROUND

A centralized or cloud radio access network (C-RAN) is one way to implement base station functionality. Typically, for each cell (that is, for each physical cell identifier (PCI)) implemented by a C-RAN, one or more baseband unit (BBU) entities (also referred to here simply as "BBUs") interacts with multiple remote units (also referred to here as "RUs," "radio units," "radio points," or "RPs") implement a base station entity in order to provide wireless service to various items of user equipment (UEs). The BBU entities may comprise a single entity (sometimes referred to as a "baseband controller" or simply a "baseband band unit" or "BBU") that performs Layer-3, Layer-2, and some Layer-1 processing for the cell. The BBU entities may also comprises multiple entities, for example, one or more central unit (CU) entities that implement Layer 3 and non-time critical Layer 2 functions for the associated base station and one or more distribution units (DU) that implement the time critical Layer 2 functions and at least some of the Layer 1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU is configured to implement the radio frequency (RF) interface and the physical layer functions for the associated base station that are not implemented in the DU. The multiple remote units are typically located remotely from each other (that is, the multiple remote units are not co-located), and the BBU entities are communicatively coupled to the remote units over a fronthaul network. The remote units may also be collocated (for example, in instances where each remote unit processes different carriers or time slices).

SUMMARY

In one example, a system includes at least one baseband unit (BBU), one or more radio units communicatively coupled to the at least one BBU, and a plurality of antennas communicatively coupled to the one or more radio units. Each respective radio unit of the one or more radio units is communicatively coupled to a respective subset of the plurality of antennas. The at least one BBU, the one or more radio units, and the plurality of antennas are configured to implement a base station for wirelessly communicating with user equipment. The base station is configured to map a synchronization signal to the plurality of antennas during a sequence of time periods. The base station is further configured to transmit the synchronization signal via each respective subset of the plurality of antennas with a first antenna beam pattern during a first time period of the sequence of time periods. The base station is further configured to transmit the synchronization signal via each respective subset of the plurality of antennas with a second antenna beam pattern via the plurality of antennas during a second time period of the sequence of time periods. The first antenna beam pattern is different than the second antenna beam pattern.

In another example, a method includes mapping a synchronization signal to a plurality of antennas during a sequence of time periods. The plurality of antennas is communicatively coupled to one or more radio units. The one or more radio units are communicatively coupled to at least one baseband unit. Each respective radio unit of the one or more radio units is communicatively coupled to a respective subset of the plurality of antennas. The at least one baseband unit, the one or more radio units, and the plurality of antennas are configured to implement a base station for wirelessly communicating with user equipment. The method further includes transmitting the synchronization signal via the plurality of antennas with a first antenna beam pattern during a first time period of the sequence of time periods. The method further includes transmitting the synchronization signal with a second antenna beam pattern via the plurality of antennas during a second time period of the sequence of time periods. The first antenna beam pattern is different than the second antenna beam pattern.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
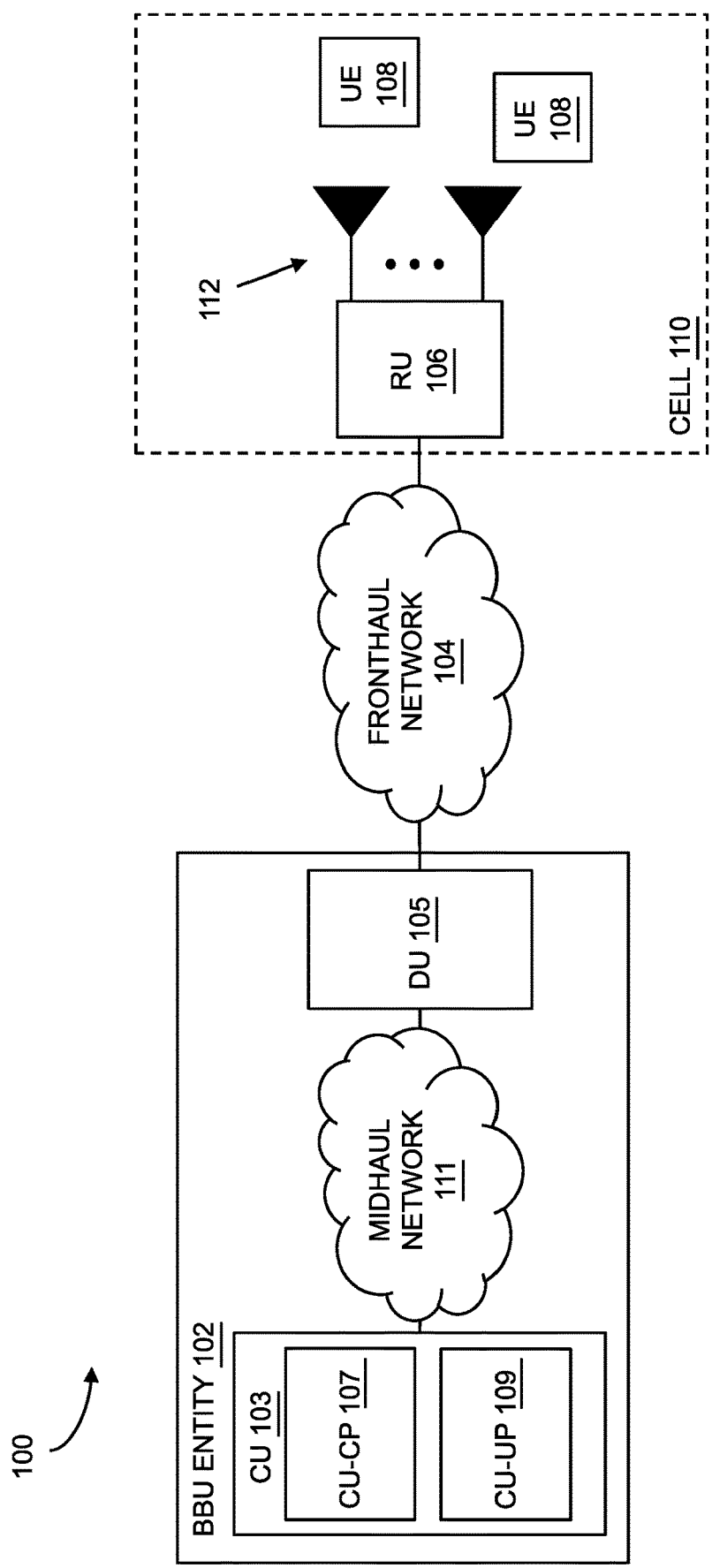
FIG. 1 is a block diagram illustrating an example radio access network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. The following detailed description is, therefore, not to be taken in a limiting sense.

In fifth generation (5G) New Radio (NR) systems, synchronization and master cell information is broadcast periodically (for example, using the Synchronization Signal Physical Broadcast Channel (SS-PBCH) Block or the Synchronization Signal Block (SSB)) by the base station (for example, gNodeB (gNB)) to enable the UEs to acquire the cell. The UEs are configured to receive, demodulate, and decode these synchronization signals transmitted from the base station (for example, on the Physical Broadcast Channel (PBCH), Primary Synchronization Signal (PSS), and Secondary Synchronization Signal (SSS)).

The synchronization information is typically mapped by the base station to a single logical transmission port that may be beamformed in a specific direction using N physical antennas mapped to that logical port. For millimeter wave (MM wave) transmissions in 5G NR systems, multiple versions of the SSB are used and each respective SSB is precoded as a beam in a different direction. The UEs typically receive one or two of these beams and respond at a timing that that corresponds to the beam that is favorable to the particular UE.

The 3GPP specification TS 38.211 for 5G NR indicates that a single logical transmission port (logical entity) should be used to transmit the SSB, and there is a specific precoding (or no precoding) that occurs (or mapping that occurs) between the logical antenna port and the physical antenna ports. Typically for cells and macro deployments, the logical antenna port is mapped to a single physical antenna port. Since every logical antenna port has limited power, the SSB block will be transmitted with less total power if multiple antennas are used. For example, if four physical antennas are coupled to the logical antenna port, then each physical antenna will transmit the signals with one-quarter of the total power. The reach of this SSB block is smaller due to the lower overall power to the UE compared to other channels that use all ports. This limits the overall size of the cell, which is undesirable.

To cover a larger cell area, the gNB can repeat a SSB several times in each period with consecutive time slots and each SSB is beamformed in a different direction. However, this approach incurs significant overhead since the additional SSB resources cannot be used for payload data. This overhead is typically deemed too wasteful in small cells where a small number of transmit antennas (for example, four or less antennas), and the overhead is particularly problematic in the lower frequency range (for example, FR1) due to the wider beams being used.

While the problems described above involves the SSB in 5G NR systems, a similar problem exists in LTE with the synchronization sequences. Therefore, although the following embodiments are primarily described as being implemented for use to provide 5G NR service, it is to be understood the techniques described here can be used with other wireless interfaces (for example, fourth generation (4G) Long-Term Evolution (LTE) service) and references to "gNB" can be replaced with the more general term "base station" or "base station entity" and/or a term particular to the alternative wireless interfaces (for example, "enhanced NodeB" or "eNB"). Furthermore, it is also to be understood that 5G NR embodiments can be used in both standalone and non-standalone modes (or other modes developed in the future) and the following description is not intended to be limited to any particular mode. Also, unless explicitly indicated to the contrary, references to "layers" or a "layer" (for example, Layer 1, Layer 2, Layer 3, the Physical Layer, the MAC Layer, etc.) set forth herein refer to layers of the wireless interface (for example, 5G NR or 4G LTE) used for wireless communication between a base station and user equipment).

FIG. 1 is a block diagram illustrating an example base station 100 in which the techniques for beamforming the synchronization signals described herein can be implemented. In the particular example shown in FIG. 1, the base station 100 includes one or more baseband unit (BBU) entities 102 communicatively coupled to a RU 106 via a fronthaul network 104. The base station 100 provides wireless service to various items of user equipment (UEs) 108 in a cell 110. Each BBU entity 102 can also be referred to simply as a "BBU."

In the example shown in FIG. 1, the one or more BBU entities 102 comprise one or more central units (CUs) 103 and one or more distributed units (DUs) 105. Each CU 103 implements Layer 3 and non-time critical Layer 2 functions for the associated base station 100. Each DU 105 is configured to implement the time critical Layer 2 functions and at least some of the Layer 1 (also referred to as the Physical Layer) functions for the associated base station 100. Each CU 103 can be further partitioned into one or more control-plane and user-plane entities 107, 109 that handle the control-plane and user-plane processing of the CU 103, respectively. Each such control-plane CU entity 107 is also referred to as a "CU-CP" 107, and each such user-plane CU entity 109 is also referred to as a "CU-UP" 109.

The RU 106 is configured to implement the control-plane and user-plane Layer-1 functions not implemented by the DU 105 as well as the radio frequency (RF) functions. The RU 106 is typically located remotely from the one or more BBU entities 102. In the example shown in FIG. 1, the RU 106 is implemented as a physical network function (PNF) and is deployed in or near a physical location where radio coverage is to be provided in the cell 110. In the example shown in FIG. 1, the RU 106 is communicatively coupled to the DU 105 using a fronthaul network 104. In some examples, the fronthaul network 104 is a switched Ethernet fronthaul network (for example, a switched Ethernet network that supports the Internet Protocol (IP)).

The RU 106 includes or is coupled to a set of antennas 112 via which downlink RF signals are radiated to UEs 108 and via which uplink RF signals transmitted by UEs 108 are received. In some examples, the set of antennas 112 includes two or four antennas. However, it should be understood that the set of antennas 112 can include two or more antennas 112. In one configuration (used, for example, in indoor deployments), the RU 106 is co-located with its respective set of antennas 112 and is remotely located from the one or more BBU entities 102 serving it. In another configuration (used, for example, in outdoor deployments), the antennas 112 for the RU 106 are deployed in a sectorized configuration (for example, mounted at the top of a tower or mast). In such a sectorized configuration, the RU 106 need not be co-located with the respective sets of antennas 112 and, for example, can be located at the base of the tower or mast structure, for example, and, possibly, co-located with its serving one or more BBU entities 102.

In the example shown in FIG. 1, at least one of the BBU entities 102 is configured to map synchronization signals to the antennas 112 coupled to the RU 106 and transmit the synchronization signals via the antennas 112 coupled to the RU 106 during particular time periods. The time periods where the transmission of synchronization signals occurs are non-consecutive time slots that repeat with some periodicity. In some examples, the time periods repeat every 10 milliseconds, 20 milliseconds, or a different amount of time depending on the system. In some examples, the time periods correspond to SSB transmission opportunities utilized by the base station 100.

The base station 100 is configured to transmit the same synchronization signal (for example, the same SSB) via the antennas 112 using different antenna beam patterns in different time periods. In some examples, the respective antenna beam patterns are produced by applying respective phase differences to the synchronization signal for the antennas 112. In some examples, the respective phase differences correspond to respective precoding vectors. In some such examples, the respective phase differences correspond to respective existing precoding vectors in a codebook from a 3GPP specification for 4G LTE or 5G NR (for example, for spatial multiplexing MIMO use cases). These respective existing precoding vectors are utilized by the base station 100 for other types of transmission, so the respective existing precoding vectors are already in the system for the base station 100. In some examples, the respective phase differences are applied to the antennas using digitally controlled analog phase shifters.

The particular antenna beam patterns to be used by the base station 100 during operation are selected prior to commissioning the base station 100. In some examples, the antenna beam patterns are selected based on the number of antennas 112 coupled to the RU 106, the assumed geometry of the antennas 112, and a simulated coverage in the cell 110 that can be achieved with the different antenna beam patterns using the antennas 112. In some examples, the selected antenna beam patterns are orthogonal to each other. In general, the selected antenna beam patterns should include different points around the base station 100 in the cell 110 where nulls and enhancements occur to provide better coverage in the cell 110 compared to using a single antenna beam pattern.

Two or more distinct antenna beam patterns are used by the base station 100 for transmission of the synchronization signal via the antennas 112. For 5G NR, the UEs 108 are instructed to attempt to read the information over four consecutive SSB opportunities, so using between two and four distinct antenna beam patterns would yield significant benefits compared to using a single antenna beam pattern. If the distinct antenna beam patterns are selected appropriately, using three antenna beam patterns will provide better performance compared to using two antenna beam patterns and using four antenna beam patterns will provide better performance for 5G NR implementations compared to using two or three antenna beam patterns. Example antenna beam patterns are discussed in more detail below with respect to FIGS. 3A-5.

During operation of the base station 100, the base station 100 is configured to sequentially switch between the predetermined antenna beam patterns for transmission of the synchronization signal during the different time periods. The sequence of antenna beam patterns is static and repeats after a particular number of time periods that depends on the number of antenna beam patterns used. For example, if the base station 100 implements four distinct antenna beam patterns for transmission of the synchronization signal, then the base station 100 will transmit the synchronization signal with a different antenna beam pattern every time period and the sequence will repeat after four time periods. If the time periods occur every 20 milliseconds in such an example, then the sequence will repeat every 80 milliseconds.

The base station 100 is also configured to receive an uplink transmission from a UE 108 in response to the synchronization signal. For example, the base station 100 is configured to receive a Random Access Channel (RACH) response during a RACH opportunity that follows the transmission of the synchronization signal. In some examples, the base station 100 is configured to determine which particular antenna beam pattern was used where the best reception of the synchronization signal by a UE 108 and to transmit a subsequent response message (for example, the Physical Downlink Shared Channel (PDSCH) response) to that UE 108 based on that determination. In some such examples, the base station 100 is configured to determine that the UE 108 had the best reception of the synchronization signal with the particular antenna beam pattern used for the most recent transmission of the synchronization signal preceding the response from the UE 108. In such examples, the base station 100 is configured to transmit a response message to the UE 108 using that particular antenna beam pattern. By using this technique, the base station 100 can increase the signal quality of the response message received at the UE 108.

While the example shown in FIG. 1 shows a single CU-CP 107, a single CU-UP 109, a single DU 105, and a single RU 106 for the base station 100, it should be understood that this is an example and other numbers of BBU entities, components of the BBU entities, and/or RUs can also be used.

Figure 2:
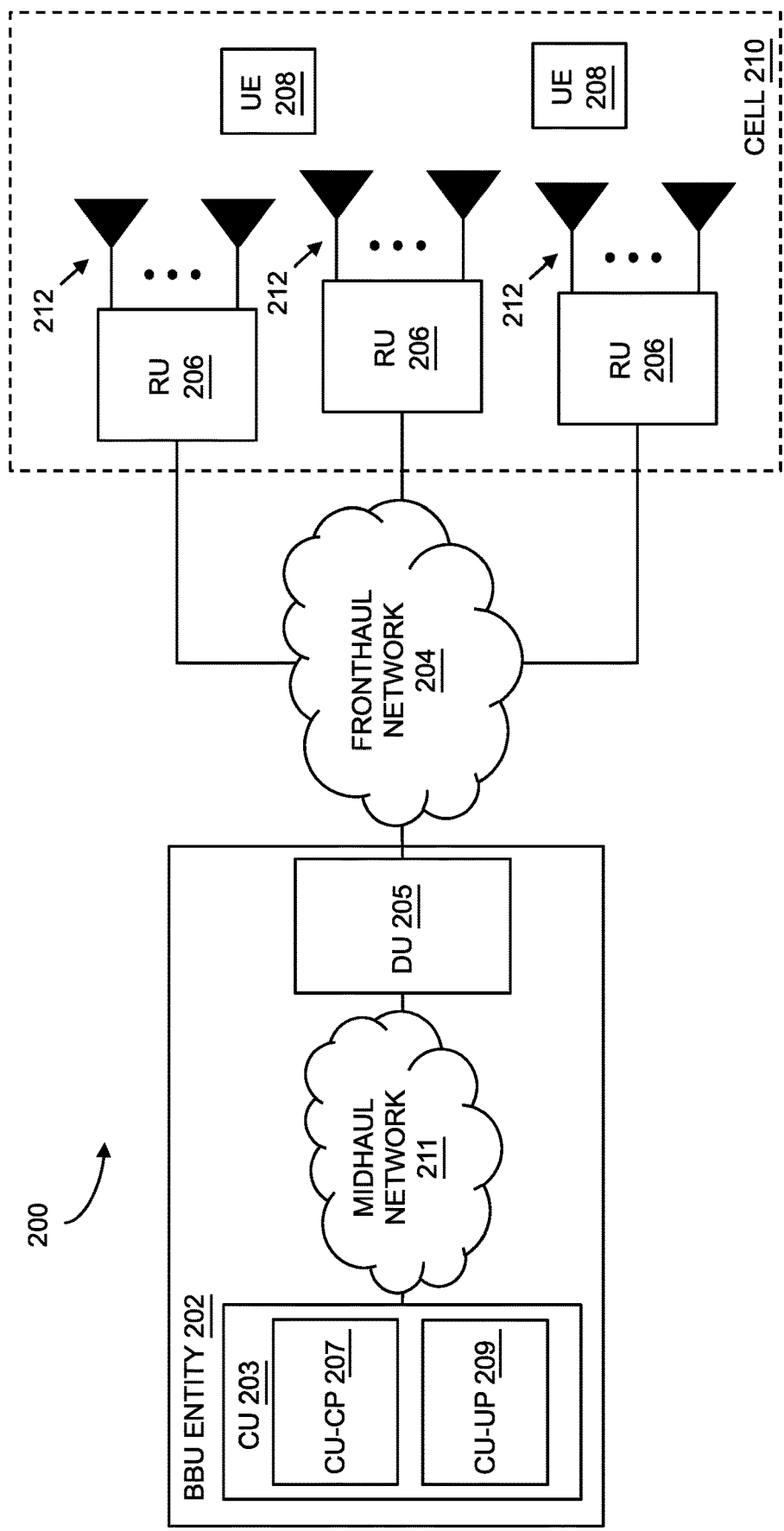
FIG. 2 is a block diagram illustrating an example radio access network.

FIG. 2 is a block diagram illustrating an example base station 200 in which the techniques for beamforming the synchronization signals described herein can be implemented. In the particular example shown in FIG. 2, the base station 200 includes one or more baseband unit (BBU) entities 202 communicatively coupled to multiple radio units (RUs) 206 via a fronthaul network 204. The base station 200 provides wireless service to various items of user equipment (UEs) 208 in a cell 210. Each BBU entity 202 can also be referred to simply as a "BBU."

In the example shown in FIG. 2, the one or more BBU entities 202 comprise one or more central units (CUs) 203 and one or more distributed units (DUs) 205. Each CU 203 implements Layer 3 and non-time critical Layer 2 functions for the associated base station 100. Each DU 205 is configured to implement the time critical Layer 2 functions and at least some of the Layer 1 (also referred to as the Physical Layer) functions for the associated base station 200. Each CU 203 can be further partitioned into one or more control-plane and user-plane entities 207, 209 that handle the control-plane and user-plane processing of the CU 203, respectively. Each such control-plane CU entity 207 is also referred to as a "CU-CP" 207, and each such user-plane CU entity 209 is also referred to as a "CU-UP" 209.

The RUs 206 are configured to implement the control-plane and user-plane Layer-1 functions not implemented by the DU 205 as well as the radio frequency (RF) functions. Each RU 206 is typically located remotely from the one or more BBU entities and located remotely from other RUs 206. In the example shown in FIG. 2, each RU 206 is implemented as a physical network function (PNF) and is deployed in or near a physical location where radio coverage is to be provided in the cell 210. In the example shown in FIG. 2, the RUs 206 are communicatively coupled to the DU 205 using a fronthaul network 204. In some examples, the fronthaul network 204 is a switched Ethernet fronthaul network (for example, a switched Ethernet network that supports the Internet Protocol (IP)).

Each of the RUs 206 includes or is coupled to a respective set of antennas 212 via which downlink RF signals are radiated to UEs 208 and via which uplink RF signals transmitted by UEs 208 are received. In some examples, each set of antennas 212 includes two or four antennas. However, it should be understood that each set of antennas 212 can include two or more antennas 212. In one configuration (used, for example, in indoor deployments), each RU 206 is co-located with its respective set of antennas 212 and is remotely located from the one or more BBU entities 202 serving it. In another configuration (used, for example, in outdoor deployments), the sets of antennas 212 for the RUs 206 are deployed in a sectorized configuration (for example, mounted at the top of a tower or mast). In such a sectorized configuration, the RUs 206 need not be co-located with the respective sets of antennas 212 and, for example, can be located at the base of the tower or mast structure, for example, and, possibly, co-located with the serving one or more BBU entities 202. Other configurations can be used.

In the example shown in FIG. 2, at least one of the BBU entities 202 is configured to map synchronization signals to the antennas 212 coupled to the RUs 206 and transmit the synchronization signals via each respective set of antennas 212 coupled to the RUs 206 during particular time periods. The time periods where the transmission of synchronization signals occurs are non-consecutive time slots that repeat with some periodicity. In some examples, the time periods repeat every 10 milliseconds, 20 milliseconds, or a different amount of time depending on the system. In some examples, the time periods correspond to SSB transmission opportunities by the base station 200.

The base station 200 is configured to transmit the same synchronization signal (for example, the same SSB) via each respective set of antennas 212 using different antenna beam patterns in different time periods. In some examples, the different antenna beam patterns are produced by applying phase differences to the synchronization signals for the antennas 212. In some examples, the respective phase differences correspond to respective precoding vectors. In some such examples, the respective phase differences correspond to respective existing precoding vectors in a codebook from a 3GPP specification for 4G LTE or 5G NR (for example, for spatial multiplexing MIMO use cases). These respective existing precoding vectors are utilized by the base station 200 for other types of transmission, so the respective existing precoding vectors are already in the system for the base station 200. In some examples, the respective phase differences are applied to the antennas using digitally controlled analog phase shifters.

The particular antenna beam patterns to be used by the base station 200 during operation are selected prior to commissioning the base station 200. In some examples, the antenna beam patterns are selected based on the number of antennas is each respective set of antennas 112 coupled to the RUs 206, the assumed geometry of each respective set of antennas 212, and a simulated coverage in the cell 210 that can be achieved with the different antenna beam patterns using the respective sets of antennas 212. In some examples, the selected antenna beam patterns are orthogonal to each other. In general, the selected antenna beam patterns should include different points around the base station 200 in the cell 210 where nulls and enhancements occur to provide better coverage in the cell 210 compared to using a single antenna beam pattern.

Two or more distinct antenna beam patterns are used by the base station 200 for transmission of the synchronization signal via the respective sets of antennas 212. For 5G NR, the UEs 208 are instructed to attempt to read the information over four consecutive SSB opportunities, so using between two and four distinct antenna beam patterns would yield significant benefits compared to using a single antenna beam pattern. If the distinct antenna beam patterns are selected appropriately, using three antenna beam patterns will provide better performance compared to using two antenna beam patterns and using four antenna beam patterns will provide better performance for 5G NR implementations compared to using two or three antenna beam patterns.

Example antenna beam patterns are discussed in more detail below with respect to FIGS. 3A-5.

During operation of the base station 200, the base station 200 is configured to sequentially switch between the predetermined antenna beam patterns for transmission of the synchronization signal during the different time periods. The sequence of antenna beam patterns is static and repeats after a particular number of time periods that depends on the number of antenna beam patterns used. For example, if the base station 200 implements four distinct antenna beam patterns for transmission of the synchronization signal, then the base station 200 will transmit the synchronization signal with a different antenna beam pattern via each respective set of antennas 212 every time period and the sequence will repeat after four time periods. If the time periods occur every 20 milliseconds in such an example, then the sequence will repeat every 80 milliseconds.

The base station 200 is configured to receive an uplink transmission from a UE 208 in response to the synchronization signal. For example, the base station 200 is configured to receive a Random Access Channel (RACH) response during a RACH opportunity that follows the best reception of the synchronization signal. In some examples, the base station 200 is configured to determine which particular antenna beam pattern was used where the best reception of the synchronization signal by a UE 208 and to transmit a subsequent response message (for example, the Physical Downlink Shared Channel (PDSCH) response) to the UE 208 based on that determination. In some such examples, the base station 200 is configured to determine that the UE 208 had the best reception of the synchronization signal with the particular antenna beam pattern used for the most recent transmission of the synchronization signal preceding the response from the UE 208. In such examples, the base station 200 is configured to transmit a response message to the UE 208 using that particular antenna beam pattern. By using this technique, the base station 200 can increase the signal quality of the response message received at the UE 208.

The base stations 100, 200 that include the components shown in FIGS. 1-2 can be implemented using a scalable cloud environment in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment can be implemented in various ways. For example, the scalable cloud environment can be implemented using hardware virtualization, operating system virtualization, and application virtualization (also referred to as containerization) as well as various combinations of two or more of the preceding. The scalable cloud environment can be implemented in other ways. For example, the scalable cloud environment is implemented in a distributed manner. That is, the scalable cloud environment is implemented as a distributed scalable cloud environment comprising at least one central cloud, at least one edge cloud, and at least one radio cloud.

In some examples, one or more components of the one or more BBU entities 102, 202 (for example, the CU 103, 203, CU-CP 107, 207, CU-UP 109, 209, and/or DU 105, 205) are implemented as a software virtualized entities that are executed in a scalable cloud environment on a cloud worker node under the control of the cloud native software executing on that cloud worker node. In some such examples, the DU 105, 205 is communicatively coupled to at least one CU-CP 107, 207 and at least one CU-UP 109, 209, which can also be implemented as software virtualized entities. In some other examples, one or more components of the one or more BBU entities 102, 202 (for example, the CU-CP 107, 207, CU-UP 109, 209, and/or DU 105, 205) are implemented as a single virtualized entity executing on a single cloud worker node. In some examples, the at least one CU-CP 107, 207 and the at least one CU-UP 109, 209 can each be implemented as a single virtualized entity executing on the same cloud worker node or as a single virtualized entity executing on a different cloud worker node. However, it is to be understood that different configurations and examples can be implemented in other ways. For example, the CU 103, 203 can be implemented using multiple CU-UP VNFs and using multiple virtualized entities executing on one or more cloud worker nodes. Moreover, it is to be understood that the CU 103, 203 and DU 105, 205 can be implemented in the same cloud (for example, together in a radio cloud or in an edge cloud). In some examples, the DU 105, 205 is configured to be coupled to the CU-CP 107, 207 and CU-UP 109, 209 over a midhaul network 111, 211 (for example, a network that supports the Internet Protocol (IP)). Other configurations and examples can be implemented in other ways.

Figure 3B:
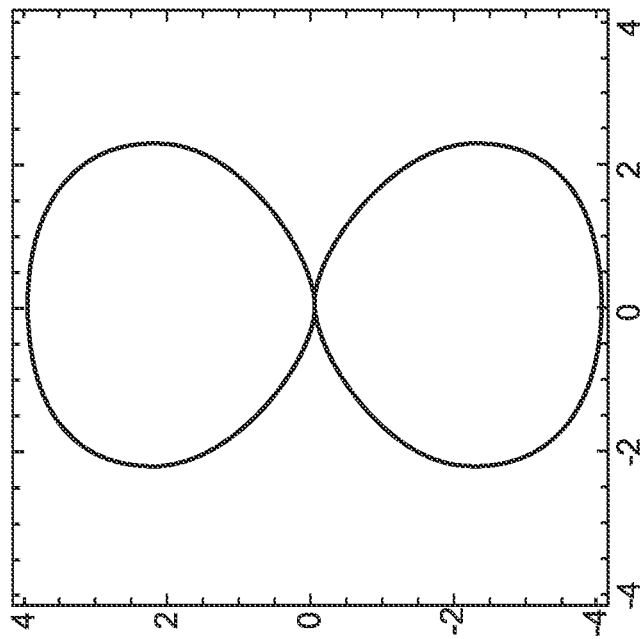
FIGS. 3A-3B are diagrams of example antenna beam patterns for transmission of synchronization signals.
Figure 3A:
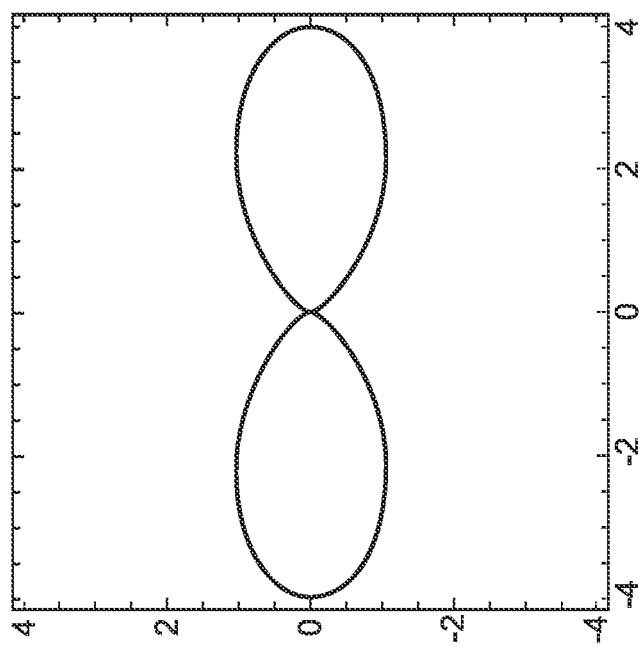

FIGS. 3A-3B illustrate two simulated antenna beam patterns 300, 310 for an RU 106, 206 with two antennas 112, 212. In particular, FIG. 3A shows an antenna beam pattern 300 with two antennas 112, 212 transmitting with no phase difference, and FIG. 3B shows an antenna beam pattern 310 with two antennas 112, 212 transmitting with 7C phase difference. In examples where the two antenna beam patterns 300, 310 shown in FIGS. 3A-3B are used, the base station 100, 200 is configured to switch between the antenna beam pattern 300 shown in FIG. 3A and the antenna beam pattern 310 shown in FIG. 3B. In some such examples, the sequence repeats after two time periods. In other examples, the base station 100, 200 is configured to transmit the synchronization signal with the antenna beam pattern 300 shown in FIG. 3A for multiple time periods (for example, two time periods) before switching to and transmitting the synchronization signal with the antenna beam pattern 310 shown in FIG. 3B for multiple time periods (for example, two time periods). In other examples, the base station 100, 200 is configured to shift the antenna beam patterns 300, 310 (for example, by 45 degrees) for transmission over two time periods and then shift the antenna beam patterns 300, 310 back to the original directions such that the antenna beam patterns 300, 310 repeat every four time periods. The examples where the antenna beam patterns are shifted (for example, by 45 degrees) would likely increase the probability that UEs will be close to the peak power.

Figure 4:
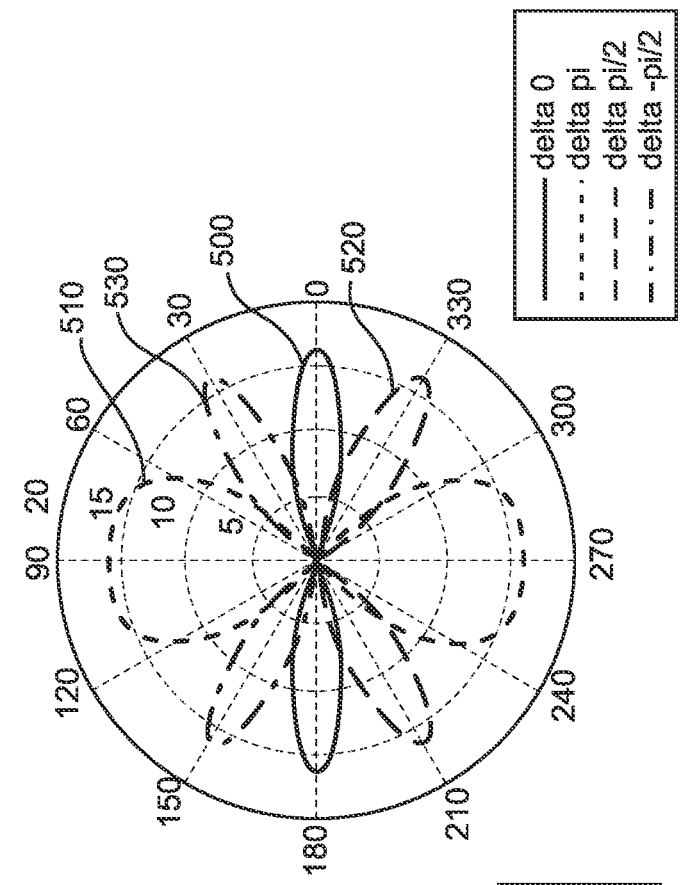
FIG. 4 is a diagram of example antenna beam patterns for transmission of synchronization signals.

FIG. 4 illustrates four simulated antenna beam patterns 400, 410, 420, 430 for an RU 106, 206 with two antennas 112, 212. In particular, FIG. 4 shows an antenna beam pattern 400 with two antennas 112, 212 transmitting with no phase difference, an antenna beam pattern 410 with two antennas 112, 212 transmitting with $\pi$ phase difference, an antenna beam pattern 420 with two antennas 112, 212 transmitting with $\pi/2$ phase difference, an antenna beam pattern 430 with two antennas 112, 212 transmitting with $-\pi/2$ phase difference. In examples where the four antenna beam patterns 400, 410, 420, 430 shown in FIG. 4 are used, the base station 100, 200 is configured to switch between the antenna beam patterns 400, 410, 420, 430 in a sequential manner over four time periods. It should be understood that the switching sequence used by the base station 100, 200 could switch between the antenna beam patterns 400, 410, 420, 430 in any order as long as each antenna beam pattern is selected over four time periods and the sequence repeats. In some examples, the base station 100, 200 is configured to shift the antenna beam patterns 400, 410, 420, 430 (for example, by 45 degrees) for transmission over four time periods and then shift the antenna beam patterns 400, 410, 420, 430 back to the original directions such that the antenna beam patterns 400, 410, 420, 430 repeat in a particular direction every eight time periods. The examples where the antenna beam patterns are shifted (for example, by 45 degrees) would likely increase the probability that UEs will be close to the peak power.

Figure 5:
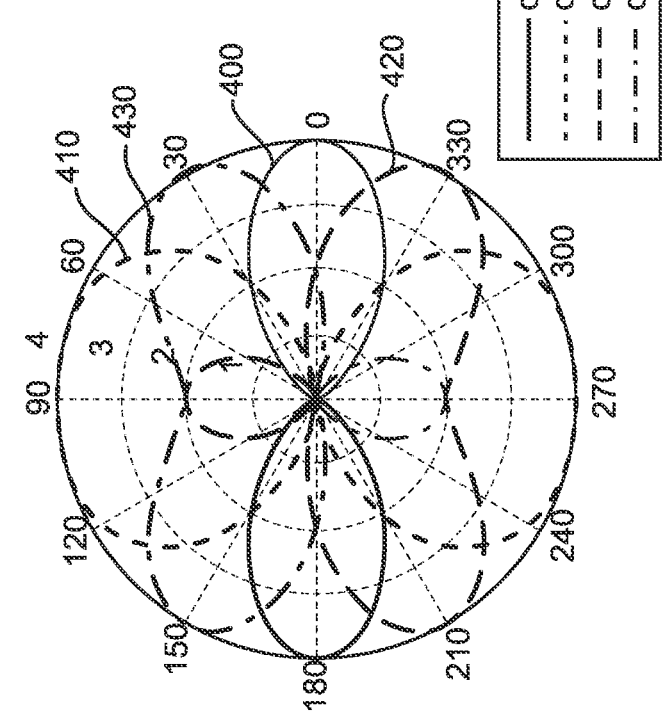
FIG. 5 is a diagram of example antenna beam patterns for transmission of synchronization signals.

FIG. 5 illustrates four simulated antenna beam patterns 500, 510, 520, 530 for an RU 106, 206 with four antennas 112, 212. In particular, FIG. 5 shows an antenna beam pattern 500 with four antennas 112, 212 transmitting with no phase difference between adjacent antennas, an antenna beam pattern 510 with four antennas 112, 212 transmitting with 7C phase difference between adjacent antennas, an antenna beam pattern 520 with four antennas 112, 212 transmitting with $\pi/2$ phase difference between adjacent antennas, an antenna beam pattern 530 with four antennas 112, 212 transmitting with $-\pi/2$ phase difference between adjacent antennas. In examples where the four antenna beam patterns 500, 510, 520, 530 shown in FIG. 5 are used, the base station 100, 200 is configured to switch between the antenna beam patterns 500, 510, 520, 530 in a sequential manner over four time periods. It should be understood that the switching sequence used by the base station 100, 200 could switch between the antenna beam patterns 500, 510, 520, 530 in any order as long as each antenna beam pattern is selected over four time periods and the sequence repeats. In some examples, the base station 100, 200 is configured to shift the antenna beam patterns 500, 510, 520, 530 (for example, by 45 degrees) for transmission over four time periods and then shift the antenna beam patterns 500, 510, 520, 530 back to the original directions such that the antenna beam patterns 500, 510, 520, 530 repeat in a particular direction every eight time periods. The examples where the antenna beam patterns are shifted (for example, by 45 degrees) would likely increase the probability that UEs will be close to the peak power.

Figure 6:
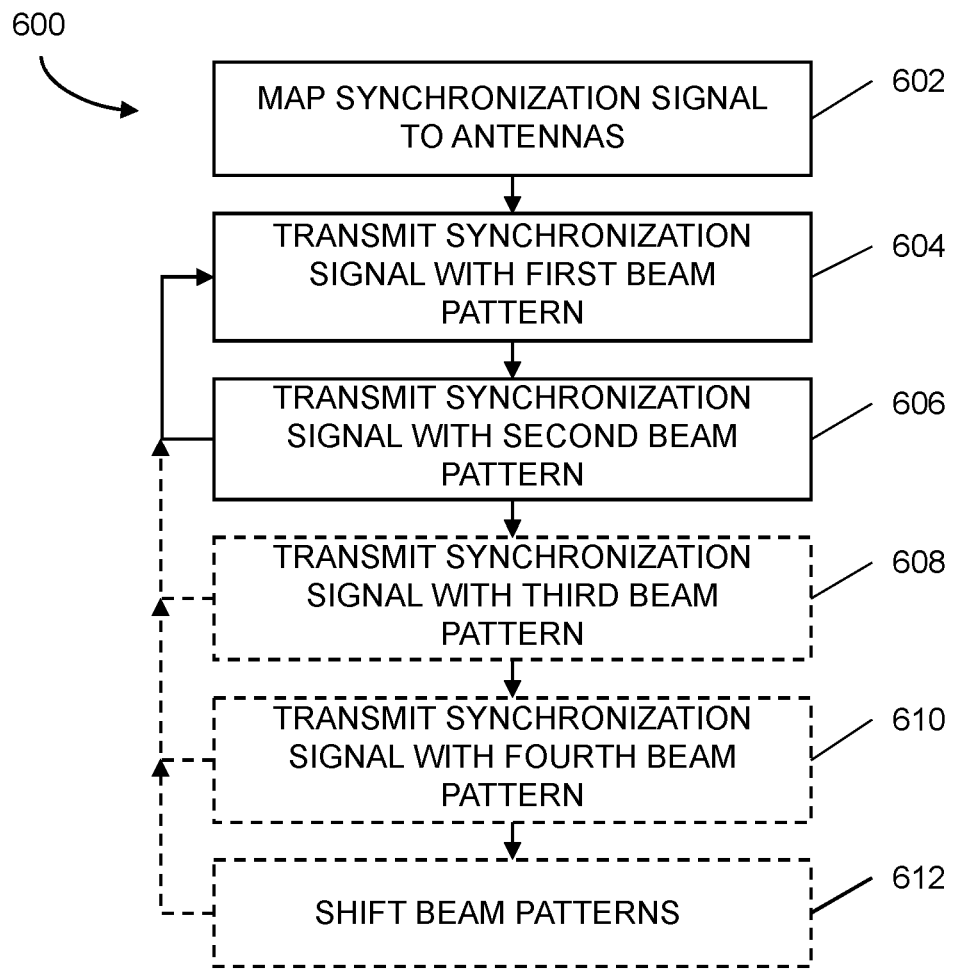
FIG. 6 is a flow diagram of an example method for beamforming synchronization signals.

FIG. 6 is a flow diagram of an example method 600 for beamforming synchronization signals. The common features discussed above with respect to the base stations in FIGS. 1-5 can include similar characteristics to those discussed with respect to method 600 and vice versa. In some examples, the method 600 is performed by a base station (for example, base station 100, 200).

The method 600 begins with mapping a synchronization signal to a plurality of antennas (block 602). In some examples, mapping the synchronization signal to a plurality of ports includes mapping the synchronization signal from a single logical port (for example, a single logical antenna port) to physical antenna ports for each of the plurality of antennas.

The method 600 includes transmitting the synchronization signal with a first antenna beam pattern (block 604). In some examples, the first antenna beam pattern is produced by applying a first phase difference to the synchronization signal for each antenna of the plurality of antennas. The transmission with the first antenna beam pattern occurs during the first time period of a sequence of transmission time periods. In some examples where multiple RUs are included in the base station (for example, as shown in FIG. 2), each respective subset of antennas associated with a respective RU transmits the synchronization signal with the first antenna beam pattern during the first time period.

The method 600 further includes transmitting the synchronization signal with a second antenna beam pattern (block 606). The second antenna beam pattern is different than the first antenna beam pattern. In some examples, the second antenna beam pattern is produced by applying a second phase difference to the synchronization signal for each antenna of the plurality of antennas, and the second phase difference is different than the first phase difference. The transmission with the second antenna beam pattern occurs during a second time period of the sequence of transmission time periods. In some examples where multiple RUs are included in the base station (for example, as shown in FIG. 2), each respective subset of antennas associated with a respective RU transmits the synchronization signal with the second antenna beam pattern during the second time period.

When only two antenna beam patterns are used, the method 600 either proceeds back to block 604 and repeats blocks 604-606 for subsequent time periods or proceeds to block 612 (discussed below) to shift the first and second antenna beam patterns prior to repeating blocks 604-606.

The method 600 optionally includes transmitting the synchronization signal with a third antenna beam pattern (block 608). The third antenna beam pattern is different than the first antenna beam pattern and the second antenna beam pattern. In some examples, the third antenna beam pattern is produced by applying a third phase difference to the synchronization signal for each antenna of the plurality of antennas, and the third phase difference is different than the first phase difference and the second phase difference. The transmission with the third antenna beam pattern occurs during a third time period of the sequence of transmission time periods. In some examples where multiple RUs are included in the base station (for example, as shown in FIG. 2), each respective subset of antennas associated with a respective RU transmits the synchronization signal with the third antenna beam pattern during the third time period.

When only three antenna beam patterns are used, the method 600 either proceeds back to block 604 and repeats blocks 604-608 for subsequent time periods or proceeds to block 612 (discussed below) to shift the first, second, and third antenna beam patterns prior to repeating blocks 604-608.

The method 600 optionally includes transmitting the synchronization signal with a fourth antenna beam pattern (block 610). The fourth antenna beam pattern is different than the first antenna beam pattern, the second antenna beam pattern, and the third antenna beam pattern. In some examples, the fourth antenna beam pattern is produced by applying a fourth phase difference to the synchronization signal for each antenna of the plurality of antennas, and the third phase difference is different than the first phase difference, the second phase difference, and the third phase difference. The transmission with the fourth antenna beam pattern occurs during a fourth time period of the sequence of transmission time periods. In some examples where multiple RUs are included in the base station (for example, as shown in FIG. 2), each respective subset of antennas associated with a respective RU transmits the synchronization signal with the fourth antenna beam pattern during the fourth time period.

Following block 610, the method 600 either proceeds back to block 604 and repeats blocks 604-610 for subsequent time periods or proceeds to block 612 (discussed below) to shift the first, second, third, and fourth antenna beam patterns prior to repeating blocks 604-610.

As discussed above, the method 600 optionally includes shifting the antenna beam patterns prior to repeating the sequence (block 612). In some examples, each antenna pattern in the sequence is shifted by the same amount for the subsequent time period where that antenna beam pattern is used for transmission. For example, each antenna beam pattern in the sequence is shifted by 45 degrees prior to the subsequent time period where that antenna beam pattern is used for transmission.

Following block 612, the method 600 proceeds back to block 604 and repeats the blocks corresponding to the number of antenna beam patterns used for transmission.

Other examples are implemented in other ways.

The example techniques described herein reduce the bandwidth used for transmitting synchronization signals to UEs compared to previous techniques that transmit multiple SSBs in consecutive time slots. The example techniques described herein also reduce null spots for synchronization signals in the cell and increase the size of the cell compared to previous techniques that did not use multiple antenna beam patterns for synchronization signals. Overall, the bandwidth used for synchronization signals and signal strength of the synchronization signals at the UEs is improved using the example techniques described herein.

The methods and techniques described here may be implemented in digital electronic circuitry, or with a programmable processor (for example, a special-purpose processor or a general-purpose processor such as a computer) firmware, software, digitally controlled analog phase shifters, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a system, comprising: at least one baseband unit; one or more radio units communicatively coupled to the at least one baseband unit; and a plurality of antennas communicatively coupled to the one or more radio units, wherein each respective radio unit of the one or more radio units is communicatively coupled to a respective subset of the plurality of antennas; wherein the at least one baseband unit, the one or more radio units, and the plurality of antennas are configured to implement a base station for wirelessly communicating with user equipment; map a synchronization signal to the plurality of antennas during a sequence of time periods; transmit the synchronization signal via each respective subset of the plurality of antennas with a first antenna beam pattern during a first time period of the sequence of time periods; and transmit the synchronization signal via each respective subset of the plurality of antennas with a second antenna beam pattern during a second time period of the sequence of time periods, wherein the first antenna beam pattern is different than the second antenna beam pattern.

Example 2 includes the system of Example 1, wherein the base station is configured to: produce the first antenna beam pattern by applying first phase differences to the synchronization signal for each respective subset of the plurality of antennas; and produce the second antenna beam pattern by applying second phase differences to the synchronization signal for each respective subset of the plurality of antennas, wherein the first phase differences are different than the second phase differences.

Example 3 includes the system of Example 2, wherein the first phase differences for each respective subset of the plurality of antennas correspond to a first precoding vector, wherein the second phase differences for each respective subset of the plurality of antennas correspond to a second precoding vector.

Example 4 includes the system of Example 3, wherein the first precoding vector and the second precoding vector each correspond to a respective precoding vector in a 3GPP specification for 4G LTE or 5G NR.

Example 5 includes the system of any of Examples 1-4, wherein the base station is configured to: transmit the synchronization signal via each respective subset of the plurality of antennas with a third antenna beam pattern during a third time period of the sequence of time periods, wherein the third antenna beam pattern is different than the first antenna beam pattern and the second antenna beam pattern; and transmit the synchronization signal via each respective subset of the plurality of antennas with a fourth antenna beam pattern during a fourth time period of the sequence of time periods, wherein the fourth antenna beam pattern is different than the first antenna beam pattern, the second antenna beam pattern, and the third antenna beam pattern.

Example 6 includes the system of Example 5, wherein the third antenna beam pattern corresponds to a shifted version of the first antenna beam pattern, wherein the fourth antenna beam pattern corresponds to a shifted version of the second antenna beam pattern.

Example 7 includes the system of any of Examples 1-6, wherein the first antenna beam pattern and the second antenna beam pattern are static during operation of the system.

Example 8 includes the system of any of Examples 1-7, wherein the base station is configured to: receive an uplink transmission from a first user equipment in response to the synchronization signal; determine whether the first user equipment received the synchronization signal via the first antenna beam pattern or the second antenna beam pattern; and transmit a response message to the first user equipment based on the determination of whether the first user equipment received the synchronization signal via the first antenna beam pattern or the second antenna beam pattern.

Example 9 includes the system of any of Examples 1-8, wherein the synchronization signal includes a 5G NR Synchronization Signal Block (SSB).

Example 10 includes the system of any of Examples 1-9, wherein the synchronization signal includes a 4G LTE synchronization signal.

Example 11 includes a method, comprising: mapping a synchronization signal to a plurality of antennas during a sequence of time periods, wherein the plurality of antennas is communicatively coupled to one or more radio units, wherein the one or more radio units are communicatively coupled to at least one baseband unit, wherein each respective radio unit of the one or more radio units is communicatively coupled to a respective subset of the plurality of antennas, wherein the at least one baseband unit, the one or more radio units, and the plurality of antennas are configured to implement a base station for wirelessly communicating with user equipment; transmitting the synchronization signal via the plurality of antennas with a first antenna beam pattern during a first time period of the sequence of time periods; and transmitting the synchronization signal with a second antenna beam pattern via the plurality of antennas during a second time period of the sequence of time periods, wherein the first antenna beam pattern is different than the second antenna beam pattern.

Example 12 includes the method of Example 11, further comprising: producing the first antenna beam pattern by applying first phase differences to the synchronization signal for each respective subset of the plurality of antennas; and producing the second antenna beam pattern by applying second phase differences to the synchronization signal for each respective subset of the plurality of antennas, wherein the first phase differences are different than the second phase differences.

Example 13 includes the method of Example 12, wherein the first phase differences for each respective subset of the plurality of antennas correspond to a first precoding vector, wherein the second phase differences for each respective subset of the plurality of antennas correspond to a second precoding vector.

Example 14 includes the method of Example 13, wherein the first precoding vector and the second precoding vector each correspond to a respective precoding vector in a 3GPP specification for 4G LTE or 5G NR.

Example 15 includes the method of any of Examples 11-14, further comprising: transmitting the synchronization signal via each respective subset of the plurality of antennas with a third antenna beam pattern during a third time period of the sequence of time periods, wherein the third antenna beam pattern is different than the first antenna beam pattern and the second antenna beam pattern; and transmitting the synchronization signal via each respective subset of the plurality of antennas with a fourth antenna beam pattern during a fourth time period of the sequence of time periods, wherein the fourth antenna beam pattern is different than the first antenna beam pattern, the second antenna beam pattern, and the third antenna beam pattern.

Example 16 includes the method of Example 15, wherein the third antenna beam pattern corresponds to a shifted version of the first antenna beam pattern, wherein the fourth antenna beam pattern corresponds to a shifted version of the second antenna beam pattern.

Example 17 includes the method of any of Examples 11-16, wherein the first antenna beam pattern and the second antenna beam pattern are static during operation.

Example 18 includes the method of any of Examples 11-17, further comprising: receiving an uplink transmission from a first user equipment in response to the synchronization signal; determining whether the first user equipment received the synchronization signal via the first antenna beam pattern or the second antenna beam pattern; and transmitting a response message to the first user equipment based on the determination of whether the first user equipment received the synchronization signal via the first antenna beam pattern or the second antenna beam pattern.

Example 19 includes the method of any of Examples 11-18, wherein the synchronization signal includes a 5G NR Synchronization Signal Block (SSB).

Example 20 includes the method of any of Examples 11-19, wherein the synchronization signal includes a 4G LTE synchronization signal.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
   at least one baseband unit;
   one or more radio units communicatively coupled to the at least one baseband unit; and
   a plurality of antennas communicatively coupled to the one or more radio units, wherein each respective radio unit of the one or more radio units is communicatively coupled to a respective subset of the plurality of antennas;
   wherein the at least one baseband unit, the one or more radio units, and the plurality of antennas are configured to implement a base station for wirelessly communicating with user equipment;
   wherein the base station is configured to:
     map a synchronization signal to the plurality of antennas during a sequence of time periods;
     transmit the synchronization signal via each respective subset of the plurality of antennas with a first antenna beam pattern during a first time period of the sequence of time periods; and
     transmit the synchronization signal via each respective subset of the plurality of antennas with a second antenna beam pattern during a second time period of the sequence of time periods, wherein the first antenna beam pattern is different than the second antenna beam pattern.

2. The system of claim 1, wherein the base station is configured to:
   produce the first antenna beam pattern by applying first phase differences to the synchronization signal for each respective subset of the plurality of antennas; and
   produce the second antenna beam pattern by applying second phase differences to the synchronization signal for each respective subset of the plurality of antennas, wherein the first phase differences are different than the second phase differences.

3. The system of claim 2, wherein the first phase differences for each respective subset of the plurality of antennas correspond to a first precoding vector, wherein the second phase differences for each respective subset of the plurality of antennas correspond to a second precoding vector.

4. The system of claim 3, wherein the first precoding vector and the second precoding vector each correspond to a respective precoding vector in a 3GPP specification for 4G LTE or 5G NR.

5. The system of claim 1, wherein the base station is configured to:
   transmit the synchronization signal via each respective subset of the plurality of antennas with a third antenna beam pattern during a third time period of the sequence of time periods, wherein the third antenna beam pattern is different than the first antenna beam pattern and the second antenna beam pattern; and
   transmit the synchronization signal via each respective subset of the plurality of antennas with a fourth antenna beam pattern during a fourth time period of the sequence of time periods, wherein the fourth antenna beam pattern is different than the first antenna beam pattern, the second antenna beam pattern, and the third antenna beam pattern.

6. The system of claim 5, wherein the third antenna beam pattern corresponds to a shifted version of the first antenna beam pattern, wherein the fourth antenna beam pattern corresponds to a shifted version of the second antenna beam pattern.

7. The system of claim 1, wherein the first antenna beam pattern and the second antenna beam pattern are static during operation of the system.

8. The system of claim 1, wherein the base station is configured to:
   receive an uplink transmission from a first user equipment in response to the synchronization signal;
   determine whether the first user equipment received the synchronization signal via the first antenna beam pattern or the second antenna beam pattern; and
   transmit a response message to the first user equipment based on the determination of whether the first user equipment received the synchronization signal via the first antenna beam pattern or the second antenna beam pattern.

9. The system of claim 1, wherein the synchronization signal includes a 5G NR Synchronization Signal Block (SSB).

10. The system of claim 1, wherein the synchronization signal includes a 4G LTE synchronization signal.

11. A method, comprising:
    mapping a synchronization signal to a plurality of antennas during a sequence of time periods, wherein the plurality of antennas is communicatively coupled to one or more radio units, wherein the one or more radio units are communicatively coupled to at least one baseband unit, wherein each respective radio unit of the one or more radio units is communicatively coupled to a respective subset of the plurality of antennas, wherein the at least one baseband unit, the one or more radio units, and the plurality of antennas are configured to implement a base station for wirelessly communicating with user equipment;
    transmitting the synchronization signal via the plurality of antennas with a first antenna beam pattern during a first time period of the sequence of time periods; and
    transmitting the synchronization signal with a second antenna beam pattern via the plurality of antennas during a second time period of the sequence of time periods, wherein the first antenna beam pattern is different than the second antenna beam pattern.

12. The method of claim 11, further comprising:
    producing the first antenna beam pattern by applying first phase differences to the synchronization signal for each respective subset of the plurality of antennas; and
    producing the second antenna beam pattern by applying second phase differences to the synchronization signal for each respective subset of the plurality of antennas, wherein the first phase differences are different than the second phase differences.

13. The method of claim 12, wherein the first phase differences for each respective subset of the plurality of antennas correspond to a first precoding vector, wherein the second phase differences for each respective subset of the plurality of antennas correspond to a second precoding vector.

14. The method of claim 13, wherein the first precoding vector and the second precoding vector each correspond to a respective precoding vector in a 3GPP specification for 4G LTE or 5G NR.

15. The method of claim 11, further comprising:
transmitting the synchronization signal via each respective subset of the plurality of antennas with a third antenna beam pattern during a third time period of the sequence of time periods, wherein the third antenna beam pattern is different than the first antenna beam pattern and the second antenna beam pattern; and
transmitting the synchronization signal via each respective subset of the plurality of antennas with a fourth antenna beam pattern during a fourth time period of the sequence of time periods, wherein the fourth antenna beam pattern is different than the first antenna beam pattern, the second antenna beam pattern, and the third antenna beam pattern.

16. The method of claim 15, wherein the third antenna beam pattern corresponds to a shifted version of the first antenna beam pattern, wherein the fourth antenna beam pattern corresponds to a shifted version of the second antenna beam pattern.

17. The method of claim 11, wherein the first antenna beam pattern and the second antenna beam pattern are static during operation.

18. The method of claim 11, further comprising:
receiving an uplink transmission from a first user equipment in response to the synchronization signal;
determining whether the first user equipment received the synchronization signal via the first antenna beam pattern or the second antenna beam pattern; and
transmitting a response message to the first user equipment based on the determination of whether the first user equipment received the synchronization signal via the first antenna beam pattern or the second antenna beam pattern.

19. The method of claim 11, wherein the synchronization signal includes a 5G NR Synchronization Signal Block (SSB).

20. The method of claim 11, wherein the synchronization signal includes a 4G LTE synchronization signal.

* * * * *